United States Patent [19]
Petrek

[11] Patent Number: 5,094,721
[45] Date of Patent: Mar. 10, 1992

[54] MULTIPLE-EFFECT EVAPORATION SYSTEM AND PROCESS

[76] Inventor: John P. Petrek, 235 Green Ave., Escondido, Calif. 92025

[21] Appl. No.: 513,112

[22] Filed: Apr. 23, 1990

[51] Int. Cl.⁵ .......................... B01D 1/26; C02F 1/04
[52] U.S. Cl. ........................ 203/22; 203/10; 203/25; 203/DIG. 17; 159/18; 159/46; 159/47.1; 202/174; 202/177; 202/185.3; 202/266
[58] Field of Search ................ 202/174, 177, 185.3, 202/181, 266; 203/25, 10, 1, DIG. 17, 22; 159/18, 47.1, 23, 46

[56] References Cited

U.S. PATENT DOCUMENTS

| | | | |
|---|---|---|---|
| 5,136 | 5/1847 | Bayless | 159/18 |
| 2,490,659 | 12/1949 | Snyder | 202/185.3 |
| 3,167,488 | 1/1965 | Malek | 202/174 |
| 3,275,530 | 9/1966 | Akers | 159/18 |
| 3,395,085 | 7/1968 | Kogan | 159/18 |
| 3,536,591 | 10/1970 | Lotz | 159/18 |
| 3,551,298 | 12/1970 | Lichenstein | 159/18 |
| 3,903,958 | 1/1976 | Maruichi | 202/174 |
| 4,187,150 | 2/1980 | Rich | 202/185.3 |
| 4,451,334 | 5/1984 | Ciocca et al. | 159/18 |

FOREIGN PATENT DOCUMENTS 77195 12/1961 France ........................ 202/174

*Primary Examiner*—Wilbur Bascomb, Jr.
*Attorney, Agent, or Firm*—Robert M. Sperry

[57] ABSTRACT

An evaporation system and process including an enclosed housing containing a plurality of shallow trays stacked vertically, one above another above a bottom-most heated reservoir with each tray serving as an evaporator and with the bottom of each tray serving as a condenser for the next lower tray and with the bottom of each tray sloping from the center outward to an outer collection trough and having a controlled supply of heat and feed liquid providing a substantially continuous supply of a regulated amount of feed liquid, with water being the primary example.

19 Claims, 3 Drawing Sheets

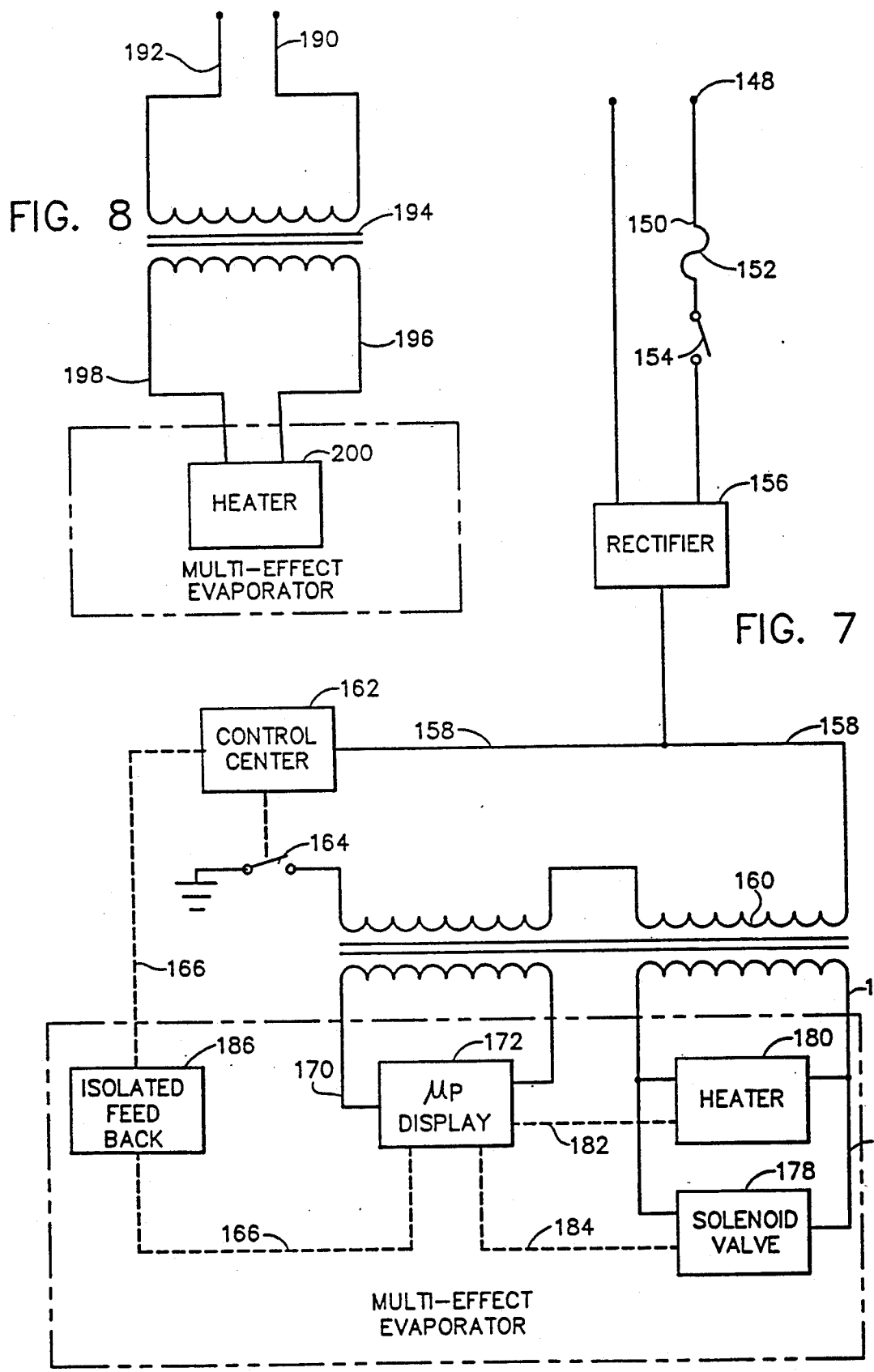

MULTIPLE-EFFECT EVAPORATION SYSTEM AND PROCESS

BACKGROUND

1. Field of Invention

The present invention relates to evaporation systems and processes and pertains particularly to a highly efficient multiple-effect evaporation system and process.

2. Prior Art

The need for potable water, for example, throughout the world is increasing rapidly with the increase in world population. At the same time, the supply of fresh potable water is decreasing with increased pollution of the environment. Many areas of the world have inadequate supplies of water and are forced to transport useable water over great distances.

Although great quantities of sea water are available in many areas of the world where fresh water is in need, known techniques for extracting fresh water are enormously expensive and essentially impractical to meet most needs. Distillation is one known method, wherein evaporation and condensation of the vapors separate phases of the liquid. Known methods of distillation are very expensive or impractical for other reasons, and generally involve boiling of the feed water.

Most commercial distillation systems utilize a simple boiler for bringing the liquid to boil to vaporize the liquid and draw off the vapor into a condenser where it is condensed and recovered. These systems are satisfactory for many applications where the cost of energy is not a primary consideration.

It is desirable that a non-boiling, heat recovery evaporation system and process that is simple and inexpensive to construct and to operate be available.

BRIEF SUMMARY AND OBJECTS OF INVENTION

It is the primary object of the present invention to provide a simple, inexpensive and efficient evaporation system and process.

In accordance with a primary aspect of the present invention, a plurality of combination liquid evaporation and condensation trays are stacked in a vertical array and have outwardly sloped bottoms for conveying condensate to an outer edge for collection, the arrangement being such that liquid to be both evaporated and concentrated is introduced into the top tray and flows through overflow tubes downward, while heat is introduced into the bottom tray and passes, by condensation of vapor, to upper trays. There may be application of the system and process for various chemical or liquid separations or concentrations wherein such separations or concentrations are a primary product, other than purified water or other liquid. One embodiment includes sloped walls so that the trays increase in size upward, and the wall aids in collection of the condensate and provides a method of trapping the vapor between the trays.

BRIEF DESCRIPTION OF THE DRAWINGS

FIG. 7 is a schematic diagram of a power and control circuit for the preferred system; and FIG. 8 is a schematic illustration of an alternative preset system.

DETAILED DESCRIPTION OF THE INVENTION

Figure 1:
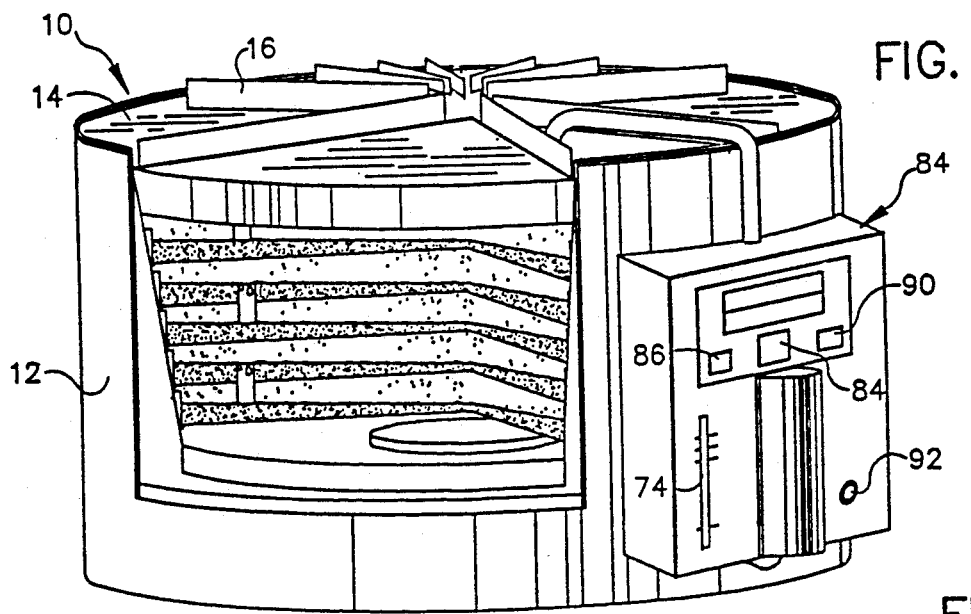
FIG. 1 is a perspective view of a preferred embodiment of an evaporation system and process in accordance with the invention.
Figure 2:
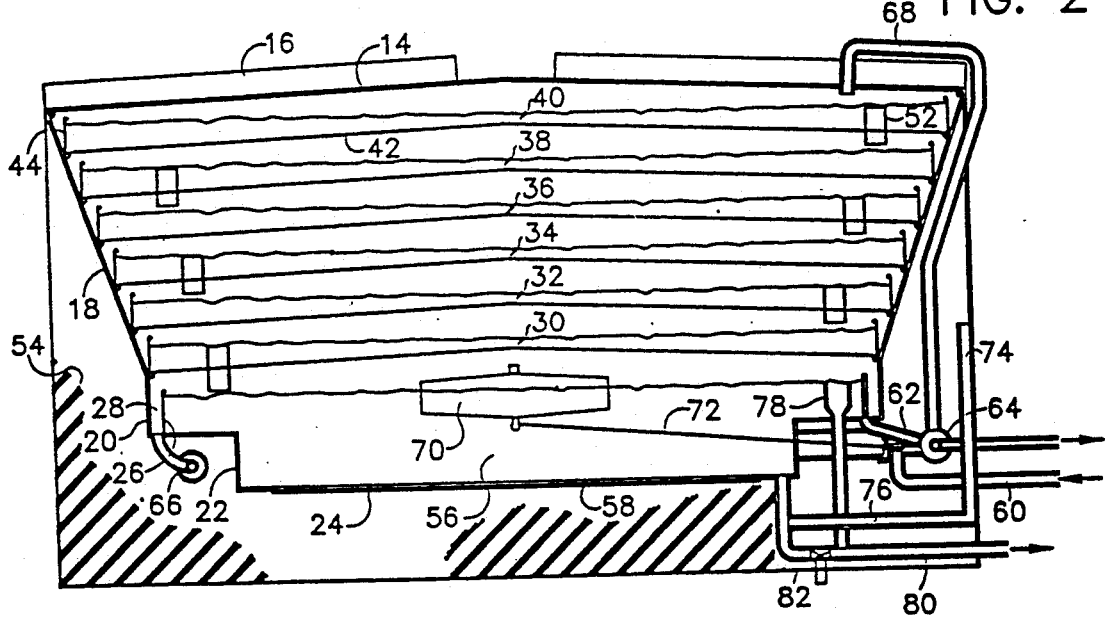
FIG. 2 is a front view in section of the embodiment of FIG. 1.

Referring now to the drawings, and particularly to FIG. 1, there is illustrated an evaporation system and process in accordance with a preferred embodiment of the invention, designated generally be the numeral 10. The embodiment, as illustrated in FIGS. 1 and 2, comprises a generally cylindrical outer housing having generally upstanding walls 12, a circular top 14, with a plurality of cooling fins 16 on the top 14. As can best be seen in FIG. 2, the overall housing includes an inner circular wall 18, having a generally frustro-conical configuration, sloping inward from the top and down to vertical wall portions 20 and 22 to a bottom 24. This inner wall structure forms an enclosed container portion or structure that will be more fully described. Inner circular wall 26, in the lower portion of the housing, is spaced inward from vertical wall 20 and forms an annular condensation collection trough 28.

Mounted within the housing or chamber defined by the inner wall 18 are a variable plurality of trays, for example, 30, 32, 34, 36, 38 and 40. Each of these trays have a sloped bottom, which slopes from the central area at the center thereof outward to vertical walls, thus forming a shallow liquid holding tray. The under surface of each of the trays forms a condensation surface for condensing vapors from the next tray below. The trays can be stepped in size, decreasing from the top to bottom to fit the sloped wall chamber 18, or can all be the same size with a vertical wall cylinder.

The top cover 14 can be similarly sloped to provide a condensation surface that carries the condensate outward to the outer edge or periphery of the surface for collection. The slope must be adequate to carry the condensate outward to the outer edges of the trays, and at the same time be sufficiently shallow as to enable a compact arrangement for keeping the surface between the liquid surface of a lower tray and the condensate surface of an upper tray as small as possible. This short distance between evaporation and condensing surface increases the efficiency of the system. Although greater or lesser slopes will function, an average slope of about two to six degrees has been found to be preferable for this purpose.

The sloping of the trays outward provides an increasingly larger surface for carrying the condensate outward. This provides a larger surface for supporting the condensate, such that it reduces the likelihood that the condensate will form droplets falling back into the tray below before flowing off the tray. In addition, this construction enables the provision of a peripheral condensate collection system, as will be explained, which includes the sloping inner walls 18.

The trays can be all identical, and for sake of convenience, only one tray 40 will be discussed in detail. The trays, as well as at least the inner portion of the housing 18, is preferably constructed of a stainless steel, such as 304 stainless steel for example. The trays are preferably constructed of material of about 16–22 thousandths of an inch thick. This enables the trays to be constructed by a process of spinning, drawing or the like and provides sufficient strength for self-support.

Referring specifically to FIG. 2, the tray 40, for example, has a bottom 42 and an upstanding peripheral wall 44 extending upward from the bottom. The wall can be constructed as a separate piece welded and/or sealed to the bottom or as an integral part thereof. The bottom 42, as previously explained, is constructed such that it slopes from the center thereof out to the peripheral edge where the wall 44 extends upward. This provides an arrangement wherein the underneath surface of the bottom 42 serves as a condensing surface for vapor coming off of the liquid in the next lower tray 38. The condensate forms as a film layer on the underneath surface of the bottom 42 and, because of the slope and pull of gravity, travels outward to the outer peripheral edge of the tray.

Due to the greater outward surface area, the condensate film layer remains thin and is able to travel to the outer peripheral edge to collect and flows downward to the collection trough 28 by the outer wall 18. In order to enable the condensate to flow down the walls, the trays are preferably mounted in a form of point contact or mount around the periphery thereof in slightly spaced relation to the peripheral wall. This construction provides a vapor seal as will be explained, though such vapor seal is not absolutely critical to the functioning of the system and process.

Figure 3:
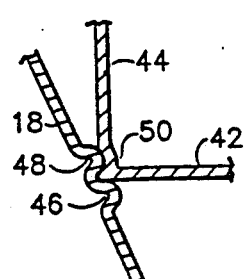
FIG. 3 is an enlarged detail view illustrating a feature of the embodiment of FIG. 1.
Figure 4:
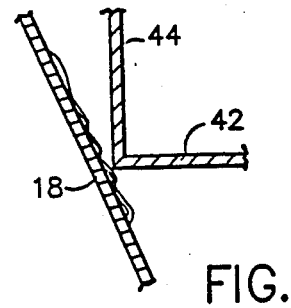
FIG. 4 is a view like FIG. 3 of another feature.

Referring specifically to FIGS. 3 and 4 for example, the wall 18 is provided with a plurality of point mounts in the form of a pair of vertically spaced dimples 46 and 48. The lowest dimple 46 is positioned to engage the bottom and corner of the tray and support it in a position such that, as shown in FIG. 4, a space exists between the wall 18 and the outer peripheral edge of the bottom 42. This provides a passage of condensate to pass downward or flow downward along the surface 18, and at the same time, enables the condensate to act as a seal to inhibit the passage of vapor or steam from the next bottom tray upward past the upper tray, though such vapor seal has not been found to be absolutely necessary.

Other means of securing the trays are useful, including the unitizing of all trays by means of three or more strips or legs to which, at a generally preferred spacing, each tray is spot welded or otherwise secured. The is the preferred approach for mass production.

It has been found that the spacing between the tray edge and the wall is somewhat necessary, and preferably is on the order of between about twenty and fifty thousandths of an inch. Greater spacing than about one-hundred thousandths, such that it cannot be effectively sealed by the flowing condensate, results in some drop in efficiency of the system. A failure to seal this peripheral edge or peripheral passage enables vapor to escape past the lower condensate surface to an area above the trays at the top.

The upper dimple 48 on the wall 18 engages a corresponding depression formed by a dimple 50 on the vertical wall portion 44 of the tray 40, forming a detent retainer for the trays. Preferably, three or more of the mounting detent structures are provided for each tray.

The tray 40 is also provided with an overflow tube 52, which extends upward beyond the bottom of the tray an amount slightly below the upper edge of the vertical wall 44. This establishes the liquid level for the tray and enables overflow or excess liquid in the tray to pass through the tube 52 downward into the tray below. Each tray is provided with an overflow tube, as illustrated, and the trays are preferably arranged such that the tubes are staggered between or on alternate sides of the center of the housing. This forces the water, for example, to flow from one side of the tray to the other in order to flow over into the next lower tray. This serve somewhat as a flushing system to more evenly distribute concentrations of brine throughout the trays in the system. Thus, the water will flow through from one side of a tray to the other, then to the next tray below. This tends to maintain a somewhat uniform distribution of brine concentration in each of the trays and throughout the tray system.

The sloping inner walls, as pointed out above, have numerous advantages in addition to the aforementioned collection function. One advantage is that it has been found to be more efficient in that the arrangement more efficiently confines the heat toward the center of the housing and in the interior of the housing, such that it flows properly upward through each of the respective trays to the exterior thereof. This is enhanced by the greater spacing of the inner wall from the outer wall, and the filling of this space with a suitable body of insulation 54.

The bottom of the interior housing forms a reservoir for containing a body of water, for example, 56 into which is introduced heat by a suitable heat source or element, such as the electric heating pad or element 58. The heating element is connected to a suitable control system to be explained. The present system is designed to be constructed in sizes, making it suitable for home use and operate on household electrical power. A system of appropriate size has three and a half and five gallons per day of fresh water from ground water or the like. The system is preferably provided with a voltage reduction transformer or high-frequency power switching converter to operate from 110 volt household power at 12 or 24 volts or any other voltage. The system can operate from either AC or DC current.

The system is preferably provided with means for automatically regulating the flow of feed liquid through the system to maintain a variably settable amount of output and to automatically flush the system periodically as needed. The system and process can also operate pre-set, whereby the rate of flow of feed liquid into the unit is pre-set to exceed the rate of output of condensate liquid. The system may be designed to utilize any source of heat, such as electrical heat, gas, heat, steam, solar or the like. The heat is introduced into the lower reservoir water 56, and vapor rising from the body of liquid 56 contacts the undersurface of tray 30 or whichever tray is the lowest, such as if a lesser number of trays are utilized and condenses thereon.

This condensation transfers heat from the condensing vapor into the liquid, the lowest tray (e.g., tray 30), which is at a few degrees cooler than the lower reservoir temperature. This heats that liquid such that vapor is then driven off of that body of liquid. That vapor in turn contacts the undersurface of the next higher tray (e.g. tray 32), which is a few degrees cooler than tray 30, and condenses thereon. The heat of condensation is then transferred through that tray into the body of liquid therein. The same process continues throughout the system, in sequence, to the uppermost tray wherein the surface of the top cover 14 serves as the final condensing surface, because each subsequent tray and cover operates at a subsequent lower temperature. A temperature gradient is established between each tray as heat is rejected through the finned top cover.

The condensate on each of the condensing surfaces flows outward to the collecting walls 18 of the housing, and then flows downward to a collection trough 28, where it is recovered and passed through a heat exchanger for transferring the heat to incoming feed liquid as will be explained.

Referring to FIG. 2, a feed liquid supply for continuously or virtually continuously feeding water for example to the system includes an inlet conduit 60, connected to a suitable source of feed water, and conveying it by way of a float-controlled pinch tube 62 to a heat exchanger, which in the illustrated embodiment includes an outer tube 64 surrounding an inner product tube 66. The supply tube connects at its outlet to a tube 68, which extends upward to and through the top cover 14 for discharge of feed liquid, such as water, into the upper tray 40. The feed water is preheated through the heat exchanger by the condensate water leaving the system. Thus the feed water enters the upper tray at about one-hundred fifty degrees or at about the full output operating temperature of the upper tray 40. Alternatively, a simple wrapping of rubber tubing one or more times around the outer area of the pure liquid trough, or any section or area of the cone, can be utilized to pre-heat the feed liquid. Alternatively, no heat exchanger need be utilized.

The float control valve 62 is actuated by a float 70, which is connected by an arm 72 to the pinch tube valve such that, as the float rises, it closes the valve when the supply of liquid in the lower reservoir reaches the desired level. Suitable adjusting means may be provided for the float control valve for adjusting the desired liquid level in the reservoir, with a sigh glass or level 74 connected by way of a tube 76 to the reservoir to enable visual viewing of the level within the system. An overflow tube 78 is provided to prevent the overflow of brine from the reservoir into the pure liquid trough. Alternatively, the liquid level can be controlled electronically, or it can be regulated by virtually continuous overflow in a system configured for some pre-set rate of flow of feed liquid.

The reservoir 56 is provided with a waste liquid drain 80, having a valve 82 that may be either manual or solenoid-controlled. This waste liquid drain may be periodically actuated, either manually or automatically, to drain a quantity of brine from the liquid in the reservoir to keep the brine concentration thereof at some controlled level. The brine in the reservoir typically increases to a concentration of about twenty times that of the feed liquid, though this is quite variable and somewhat controllable. Therefore, the brine should be periodically flushed to the extent of maintaining a reasonable concentration therein.

As an example from certain feed water, four and one-half gallons of feed water can be used to produce four gallons of fresh water. In a typical example, one cup of the brine may be drained from the reservoir 56 every six hours for a four gallon per day system. Where higher concentrations of salts and/or contaminants exist, such as in direct sea water, more frequent flushing would be required.

As soon as liquid, water for example, is drained from the body or reservoir 56, the float 70 drops opening valve 62 and enabling fresh feed water to flow in through the heat exchanger and through tube 68 to the upper tray 40. The excess water flowing into the top tray 40 flows down into each successive tray as each tray overflows and automatically maintains each tray at a desired level to eventually refill the reservoir 56 to its pre-set level. The controls of the system may be automatic or manual as desired. In the illustrated embodiment, a control module designated generally at 84 is provided.

A system pre-set as to rate of flow of feed liquid, and, hence, also pre-set as to approximate volume of output of purified water, does not require the above described float valve/pinch tube or solenoid drain sub-systems. Such a system functions through virtually continuous overflow through overflow fixture 78.

The illustrated system, when designed for home use, has overall dimensions of about ten inches in height and about fourteen inches in diameter with seven effects of recoveries. The unit is able to produce between three and a half to five gallons per day on approximately eighty to one-hundred and twenty-five watts of electrical power. This contrasts with about 800 watts for a comparable output conventional distillation system. The power is preferably supplied to the heating unit at 12 or 24 volts for safety reasons.

Figure 5:
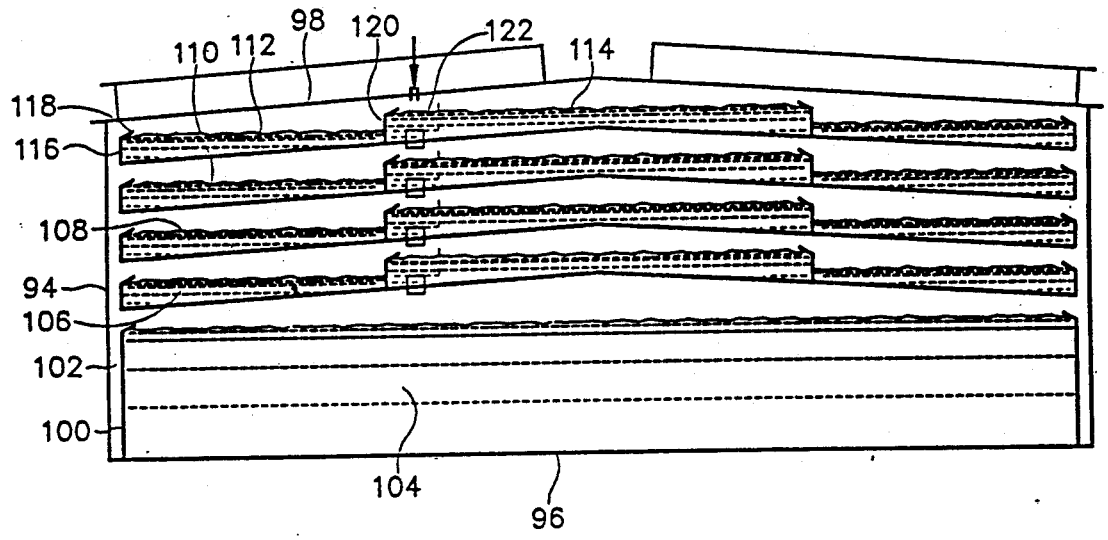
FIG. 5 is a view like FIG. 2 of an alternative embodiment.

The system may have either a circular or a rectangular configuration as will be described. Referring for example to FIG. 5, a higher volume system is illustrated in a rectangular embodiment. In this embodiment for example, a housing 94 has a bottom 96 and a top or cover 98. An inner peripheral wall 100 forms a peripheral collection trough 102 and a lower reservoir 104. A plurality of multiple level trays 106–112 are mounted within the housing. Each tray is identical, and a tray 112, for example, has a sloping bottom 114 that continues or slopes from the center thereof outward to upwardly extending peripheral wall 116, which has an inwardly directed outer or upper rim 118. This upper rim 118 curves inward below to extend below the outer edge of an upper tray peripheral edge. This enables the condensate to run off the outer edge of the above tray and be directed off the outer wall of the lower tray without falling into the lower tray.

Because of the shallowness of the trays and the larger size thereof, each tray includes a multiple level portion. The tray 112, for example, includes inner peripheral walls 120 forming an inner reservoir and an outer peripheral reservoir between the wall 120 and wall 116. The feed liquid is fed into the inner reservoir formed by wall 120 and flows over the upper edge of wall 120 into the outer reservoir to maintain the outer peripheral reservoir full and flows through an overflow tube 122 into the inner reservoir of the tray below. A tray can be constructed with two or three inner reservoir sections. This enables one to keep the trays shallow and to increase the width, length or diameter thereof.

Figure 6:
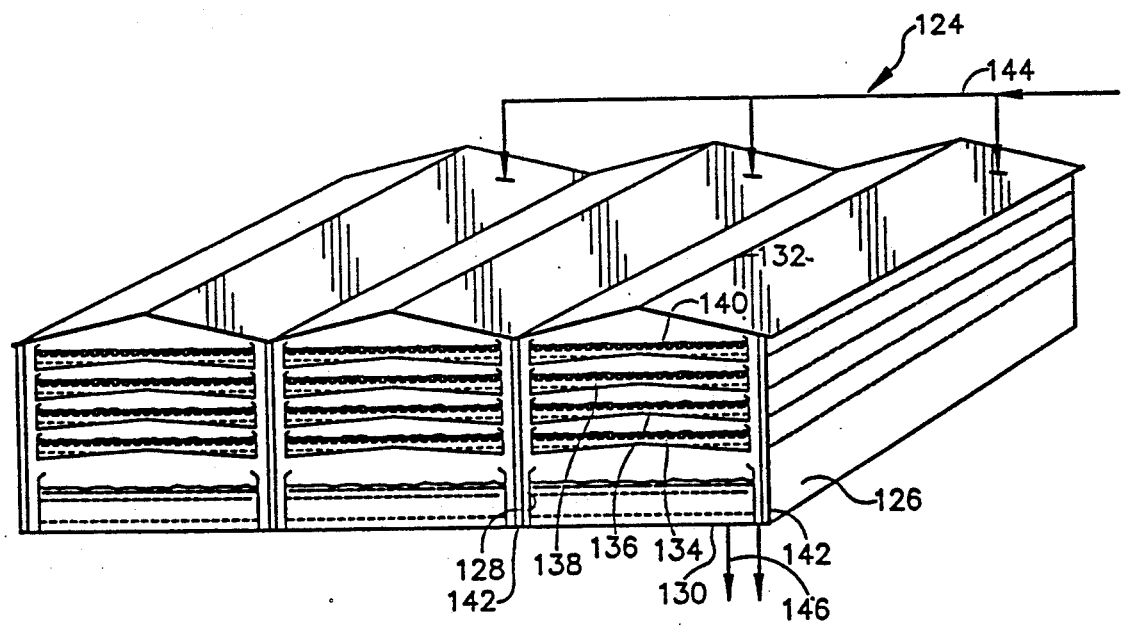
FIG. 6 is a view like FIG. 1 of yet another embodiment.

Referring to FIG. 6, a perspective schematic illustration of a large capacity rectangular tray system is shown. In the illustrated embodiment, the system may include a plurality of adjacent or parallel units that are separately integrated to the extent that the may have a common heated lower reservoir and collection system. In the illustrated embodiment, for example, each unit comprises a generally rectangular housing having parallel side walls 126 and 128, with a bottom 130 and a sloped top 132. A plurality of trays 134 through 140 have bottoms that slope outward to outer vertical walls 126 and 128 to outer condensate collection channels 142 and conveying arrangement as previously described. A suitable feed liquid system 144 provides feed liquid to the system. A waste liquid drain 146 periodically drains a portion of the brine from the bottom reservoir. The heat may be introduced into the system in any suitable manner into the bottom reservoir as previously described. The heat may also be from any suitable source as previously described.

Referring to FIG. 7, there is illustrated an exemplary schematic of a switching power supply and control circuit for the system. The system includes suitable conductor 150 connected to a source of electrical power 148, such as a household electrical outlet. The conductor 150 is connected through the usual fuse 152 and power switch 154 to a rectifier 156. A conductor 158 is connected to a transformer 160 with a 12 or 24 volt and 130 watt output and control center 162 to operate the switcher and provide isolated feedback from the microprocessor 172.

A second coil or "catch" in the transformer 160 having about 5 volts output is connected to the power source through a suitable conductor 170, and supplies power to a microprocessor 172 which is connected to a display and control center 162. The CPU receives input from the heater conduit 182 and drain conduit 184 and can be programmed to control these units by the control center 162 via conduit 166 through an isolated feedback 186 in a manner desired. For example, the heater 180 can be controlled by the control center 162 to vary the output, within limits, in accordance with demand or the like. The drain cycle can also be controlled by the CPU 172 in accordance with a time cycle or in response to a concentration sensor (not shown) in the reservoir.

Power for operation of the drain solenoid valve 178 is supplied via conductors 176 and 174 and controlled by the CPU 172 via control conduit 184. The system may be simplified for home use systems by eliminating the CPU and providing a timer or a simple manual switch to control the solenoid valve and heater. The system may also be enhanced for large scale or more expensive systems.

A pre-set version of the entire system is illustrated in FIG. 8, and would require only a direct wiring between the heating pad or element and an appropriate transformer or power switching converter. As illustrated, a pair of conductors 190 and 192 are connected directly to a transformer 194, which is connected by conductors 196 and 198 directly to a heating element 200.

In operation, a unit (e.g., FIGS. 1-4) of the appropriate size and construction is selected and installed so that it is level or nearly so. The unit feed water inlet 60 is connected to a source of feed water such as tap water, sea water or the like. The product outlet line is connected to or directed toward a storage tank or reservoir, and the waste water drain 80 is connected to or directed toward a drain. With the reservoir 56 empty, float 70 will depress lever 72 and activate fill valve 62, initiating a flow of feed water into upper tray 40 via feed water line 68. As the level of water in tray 40 reaches the top of overflow tube 52, water flows down into the next tray 38 below, and so on until all trays and reservoirs 56 are full, at which time valve 62 is closed. A manual level adjuster 92 is set to hold and control the water level in the reservoir 56 at a constant level. Such level adjuster is not necessary on a unit configured as pre-set.

The unit is then connected to a suitable source of heat, such as to a source of electrical power. The illustrated embodiment, which is designed for home use, would be connected to a 110 volt electrical outlet. The power goes through a transformer or power converter so that the voltage is reduced to 12 or 24 volts or any other voltage and then to a heating element 58. The power to the heating element will be controlled by a control unit 84, which preferably includes one or more adjusting means for adjusting the total wattage applied by the heater. The amount of heat applied can determine the production of the unit within limits. The home size is designed to use a 125 watt rated heating element and to produce from zero to about five gallons of water per day. The drain can be put on a timer, such that periodic draining or the brine from the reservoir 56 acts to partially flush the system and maintain reasonable concentrations of the brine.

As soon as the water in the reservoir is heated above the feed water temperature, steam is produced which contacts the bottom of the lowest tray, e.g. tray 30 and condenses. The heat is transferred from the steam into the bottom of tray 30 and heats the water in that tray. The condensate flows from the bottom of the tray 30 to the outer edge thereof, where it contacts the wall 18 and flows down to the collection trough 28. When the tray 30 has been heated sufficiently to give off steam, that steam will condense on the bottom of tray 32 and so on up through all trays of the system to the top cover 14. The heat from the top cover 14 is radiated or convected out into the air or may be cooled by a fan or other arrangement. Tests have indicated that there will be about a five to ten degree drop in temperature from the reservoir 56 to the water in tray 30 and between each tray to the top cover. The spacing between the water surface in each tray and the condensing surface of the upper tray should be on the order of about one-half inch or less. This spacing takes advantage of diffusion and minimizes convention for greater efficiency.

While I have illustrated and described my invention by means of specific embodiments, it is to be understood that numerous changes and modifications may be made therein without departing from the spirit and scope of the invention as defined in the appended claims.

I claim:

1. An evaporation system comprising:
    housing means defining an enclosure having a top, a bottom and vertical wall means;
    a plurality of removable shallow trays positioned in a vertical array, one above another in said housing, said trays each having a top surface containing liquid to be evaporated and having a bottom surface defining a condensing surface sloping from a center to an outer edge thereof for conveying condensate to said outer edge;
    condensate collecting means for collecting condensate from said outer edge;
    a liquid reservoir at the bottom of said housing;
    means for providing a substantially continuous supply of liquid to the top tray and thereafter sequentially to the other trays and said reservoir;
    means for supplying heat to said reservoir for vaporizing liquid therein;
    means to recover and transfer said heat through each of said trays to the top of said housing; and
    heat exchanger means projecting upwardly from the top of said housing to dissipate excess heat.

2. The evaporation system of claim 1 wherein: said heat exchanger comprises a plurality of fins.

3. The evaporation system of claim 1 wherein:

said trays are supported on said wall means at spaced points around the edge thereof in spaced relation to said wall means for defining vapor seal means for enabling condensate flow and inhibiting the escape of vapor between said trays.

4. The evaporation system of claim 1 wherein:
said means for collecting said condensate from said outer edges comprises a plurality of generally vertical walls encircling said trays and a bottom collecting trough.

5. The evaporation system of claim 4 wherein:
said walls slope inward from the top to the bottom.

6. The evaporation system of claim 5 wherein:
said trays are circular.

7. The evaporation system of claim 1 wherein:
said tray bottoms slope at an angle in the range of two to six degrees.

8. The evaporation system of claim 1 wherein:
said means for providing a substantially continuous supply of liquid into said trays and said reservoir comprises overflow means for each of said trays for maintaining a fixed level and for conveying excess liquid therein to the tray below.

9. An evaporation system comprising:
housing means defining an enclosure having a top, a bottom and vertical wall means;
a plurality of removable shallow trays positioned in a vertical array, one above another in said housing, said trays each defining a combination evaporator/condenser, with each having a top surface containing the liquid to be evaporated and having a bottom surface defining a condensing surface sloping from a center to an outer edge thereof for conveying condensate to said outer edge;
a liquid reservoir at the bottom of said housing;
said trays each supported with said outer edge in proximity with said wall means for enabling condensate to flow therebetween and for defining at least a partial vapor seal therebetween to trap the vapor between said trays;
condensate collecting means for collecting condensate from said outer edge; means for providing a substantially continuous supply of liquid flowing sequentially to the lower trays and to top tray and thereafter said reservoir;
means for supplying heat to said reservoir for vaporizing liquid therein; and
heat exchanger means projecting upwardly from the top of said housing to dissipate excess heat from the uppermost tray to establish a temperature gradient between each of said trays and said reservoir.

10. The evaporation system of claim 9 wherein:
said heat exchanger means comprises a plurality of fins.

11. The evaporation system of claim 9 wherein:
said tray bottoms slope at an angle in the range of two to six degrees.

12. The evaporation system of claim 11 wherein:
said wall means slope inward from the top to the bottom.

13. The evaporation system of claim 9 wherein:
said trays are circular.

14. The evaporation system of claim 9 wherein:
said trays are mounted by detent means to said wall means at spaced points around the outer edge thereof.

15. The evaporation system of claim 9 wherein:
said means for providing liquid to said trays and said liquid reservoir at the bottom of said housing comprises overflow means for each of said trays for maintaining a fixed liquid level and for conveying excess liquid therein to each tray below.

16. The evaporation system of claim 1 further including
second heat exchanger means wherein said supply liquid serves to cool the condensate from said condensate collecting means.

17. The evaporation system of claim 9 further including
second heat exchanger means wherein said supply liquid serves to cool the condensate from said condensate collecting means.

18. A process for the separation and concentration of liquids by evaporation, comprising the steps of:
arranging a plurality of evaporating and condensing trays in a vertical tier so that the top surfaces of each of said trays contains the liquid to be separated and evaporated and the bottom surfaces of upper trays define condensing surfaces for condensing liquid evaporated from lower trays;
causing the bottom surface of each of said trays to slope down wardly from the center to an outer edge;
introducing a quantity of liquid to be evaporated and concentrated into a top one of said tier of trays:
providing a flow of said liquid from each upper tray into a next lower tray causing said liquid to successively increase in concentration;
providing a collection reservoir of said separated and concentrated liquid at the bottom of said tier of trays;
introducing heat into said reservoir to cause separation and concentration of said liquid by vaporizing the liquid therein;
collecting condensate from the outer edges of said condensing surfaces of said trays;
collecting and removing the separated and concentrated liquid from said reservoir; and
removing excess heat from said condensate.

19. The process of claim 18 wherein:
causing the bottom surface of each tray to slope from the center to an outer edge at an angle in the range of 2 to 6 degrees.

* * * * *